United States Patent [19]

Hubler

[11] Patent Number: 5,311,063
[45] Date of Patent: May 10, 1994

[54] AUTOMATIC LOAD SPEED CONTROLLER FOR ENGINE GOVERNOR

[75] Inventor: Scott M. Hubler, Allentown, Pa.

[73] Assignee: Hubler Corporation, Allentown, Pa.

[21] Appl. No.: 58,783

[22] Filed: May 7, 1993

Related U.S. Application Data

[63] Continuation of Ser. No. 759,227, Sep. 13, 1991, abandoned, which is a continuation-in-part of Ser. No. 361,307, Jun. 5, 1989, abandoned.

[51] Int. Cl.[5] ............. H02P 9/04; F02D 31/00
[52] U.S. Cl. ............. 290/40 C; 123/320; 123/351; 290/40 R; 290/40 B
[58] Field of Search ............. 290/40 R, 40 B, 40 C; 123/320, 351

[56] References Cited

U.S. PATENT DOCUMENTS

| | | | |
|---|---|---|---|
| 2,804,551 | 8/1957 | McFarland | 290/40 R |
| 3,612,892 | 10/1971 | Nobile et al. | 290/40 R |
| 3,701,556 | 10/1972 | Richmond | 290/40 B |
| 4,181,103 | 1/1980 | Sturdy | 123/320 |
| 4,307,690 | 12/1981 | Rau et al. | 290/40 R |
| 4,531,489 | 7/1985 | Sturdy | 123/320 |

FOREIGN PATENT DOCUMENTS

| | | | |
|---|---|---|---|
| 283 | of 1886 | United Kingdom | 290/40 R |
| 246572 | 10/1924 | United Kingdom | 290/40 R |

Primary Examiner—A. D. Pellinen
Assistant Examiner—Robert L. Hoover
Attorney, Agent, or Firm—Sanford J. Piltch

[57] ABSTRACT

A vehicle engine speed controller for automatically determining the electrical load demand made of the engine electrical system from portable auxiliary and vehicle mounted electrically operated or controlled equipment, singly or in combination, and controlling the engine throttle speed setting through a governor with certain fail safe control mechanisms.

9 Claims, 6 Drawing Sheets

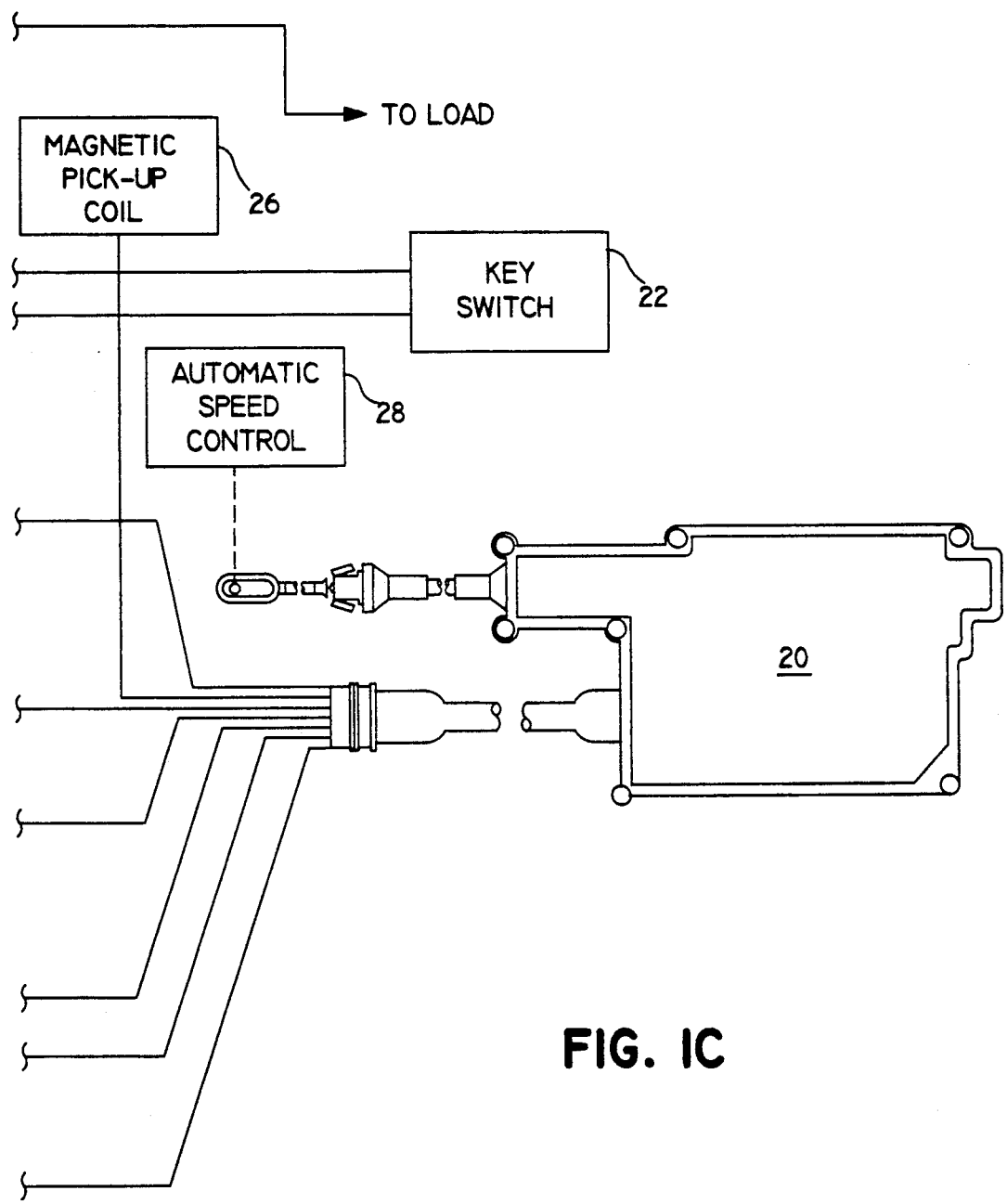
FIG. IC

AUTOMATIC LOAD SPEED CONTROLLER FOR ENGINE GOVERNOR

CROSS-REFERENCE TO RELATED APPLICATION

This application is a continuation of U.S. patent application Ser. No. 07/759,227, filed Sept. 13, 1991, now abandoned which is a continuation-in-part of U.S. patent application Ser. No. 07/361,307, filed Jun. 5, 1989 now abandoned.

BACKGROUND OF THE INVENTION

This invention relates to the field of regulating engine speed or revolutions dependent directly upon required electrical output to safely operate portable pumps and auxiliary lighting equipment and/or other vehicle mounted equipment, such as aerial lift booms with buckets or platforms.

In order to set or regulate the power output of a vehicle alternator or generator to operate the portable auxiliary or vehicle mounted equipment, the engine speed or revolutions must be increased from idle speed to satisfy the load applied to a voltage inverter placed across the output of the alternator or generator. When vehicle speed was controlled by manipulating the throttle plate of an engine mounted carburetor, a 12 vdc electric solenoid was attached to the throttle linkage which would be activated when the inverter was turned on. The solenoid would allow only one preset engine speed. The engine would be set for the maximum load which could be applied to the inverter, e.g. 6000 watts. If the inverter was operated at a lower load factor, the vehicle engine would be operating at a higher rpm rate than necessary to sustain operation of the portable auxiliary or vehicle mounted equipment creating a significant opportunity for engine damage and excessive fuel consumption.

When vehicle manufacturers began producing light, medium and heavy duty trucks, and other vehicles with electronic fuel injection mechanisms, the solenoid could no longer be utilized to control engine speed. If the engine speed were preset with a load on the inverter and the load was decreased or removed entirely, the engine rpm would increase to the maximum engine rpm causing damage to the engine. If the engine speed were set with no load and then a load was applied to the inverter, the engine rpm would decrease to idle with a resulting lack of control over the portable auxiliary or vehicle mounted equipment due to a reduction of inverter output voltage.

After a great deal of experimentation with several types of speed control mechanisms, a stationary engine governor for use with gasoline and diesel engines was adapted for use on moveable vehicles having a dc based electrical system. The engine governor has a microprocessor controller which determines engine speed depending upon the indications received from one or more sources in the engine. The sources may be, for example, an ignition coil, a pulse generator, a magnetic pick-up coil, or an ac tap on the alternator, all of which can indicate engine rpm. The engine governor operates to increase the engine speed to a preset rpm and monitor the actual engine rpm. If the engine rpm changes, the governor will return the engine rpm to its preset speed.

The initial test of the governor in the system with the inverter required the inverter to be turned off when the governor was engaged for the governor to work properly. It was determined that the cause of this problem was too much alternating current from the output of the inverter entering the control system. For proper operation of the control system, the governor required a filter on its speed control inputs to provide suitable dc signal levels.

It was then determined that a single engine speed setting was insufficient for the inverter to operate properly for different loads. In accordance with the present uses for the portable and vehicle mounted equipment, including the aerial lift boom, pumps, fans and heaters, and hand power tools, several different engine speeds are required depending upon the use, or combined uses, of each of these items. The governor was programmed for a maximum of four engine speed settings which would allow for different loads for one or up to the four engine speed settings to be used. A final modification included the ability to automatically increase the engine speed to its highest setting if a greater load is applied and to return to the preset engine speed when the load is removed. Certain safety and fail safe conditions have also been designed into the system.

Alternatively, a second embodiment eliminates a great number of monitoring and control circuit elements, reducing the required number of dc voltage control levels to be applied to the governor. It is still required, however, to delay the controlling effect of the governor over the engine rpm until the engine reaches a steady idle speed after starting or restarting. Additionally, the speed settings desireable for use can be programmed into the governor and used, as required, for the electrical demand detected by the inverter for all operating equipment.

It is, therefore, an object of the present invention to control the engine speed of a vehicle depending upon the detected load applied to the alternator/inverter combination by portable auxiliary equipment, such as pumps, heaters, and the like, or vehicle mounted equipment, such as an aerial bucket.

It is a further object of the present invention to automatically set the required wattage output of the inverter depending upon the load demand of the operated auxiliary and/or vehicle mounted equipment.

It is still a further object of the present invention to return the engine speed to a preset speed, or return to engine idle, upon the removal of the load demand from the auxiliary or vehicle mounted equipment.

It is yet another object of the present invention to provide an engine speed controller which automatically adjusts engine speed to load demand of vehicle mounted or used equipment and returns such engine speed to one of a plurality of preset engine speeds when the load is removed.

Other objects will appear hereinafter.

SUMMARY OF THE INVENTION

The present invention is an automatic control system for regulating vehicle engine speed depending upon the load demand from portable auxiliary and/or vehicle mounted equipment. The load, or wattage power requirement, for the equipment depends upon the usage of one or a combination of equipment or electrically powered devices from a source of electricity associated with the vehicle. The engine speed governor is set to the appropriate throttle control position for obtaining the required engine speed to satisfy the wattage power requirement for the equipment desired to be used.

The voltage output of the high amperage alternator or generator is monitored through an associated inverter by the speed controller means to determine any percentage drop in voltage output. A drop in voltage output indicates an increase in the load demand beyond that set by the operator. When a voltage drop of a predetermined percentage is detected, the controller means signals the vehicle engine speed governor to increase the throttle control to accommodate the new current demand. Once this is accomplished, the controller means begins to monitor the output current of the inverter to detect when the current drops back to the level expected with the original manually or automatically selected wattage output. Upon detection of the current output decreasing to the level of the original wattage output selection, the engine speed governor is signalled to decrease the throttle control and return to the original engine speed setting.

If used with a land mobile vehicle such as a truck, several fail safe conditions for operating require that the parking brake be set fully "on" with the gear shift mechanism in "neutral" or "park" (if the vehicle is equipped with an automatic transmission) or the automatic wattage power requirement for the controller means of the system will not operate. Similar safety conditions will satisfy this requirement for water and air craft. Also, the inverter is required to be "on" or dc power will not be applied to the control system. The system will remain "off" and inoperable. Further, when the key switch is turned off, the inverter is turned off, or a safety circuit is broken, a timing relay is employed to permit the engine speed governor to release control of the engine throttle control so that the engine will return to idle speed and not be restarted at an increased rpm setting.

The invention may be described as a vehicle engine speed controller means for automatically determining the electrical load demand made of the engine electrical system from portable auxiliary and vehicle mounted electrically operated or controlled equipment, singly or in combination, and controlling the engine throttle speed setting by means of an engine speed governor. The controller means comprises an electrical power source, an inverter means for converting and monitoring electrical power produced by the vehicle engine coupled to the electrical power source, and an engine speed governor, adaptable for mounting to an automatic speed control means on the vehicle engine. The controller means further comprises a filter means coupled to the electrical power source for virtually reducing electrical noise emanating from the vehicle engine ignition, alternator or generator, or the inverter means, and for generating preselected positive and ground signals to be provided to power the engine speed governor.

In a first embodiment of the invention, included in the controller means is a first relay means for interrupting the preselected positive voltage signal to the engine speed governor in accordance with the application and removal of a governor on/off signal. This signal is generated by a second relay means as a result of the presence of a first signal from the inverter means and a parking brake engaged signal. The second relay means also has a preset time delay means for delaying the interruption of the preselected positive voltage signal until a time subsequent to the removal of the first signal from the inverter means and expiration of the preset time period.

Also included in the controller means is a third relay means coupled with a multi-stage selector switch means for selecting a desired electrical load demand to accommodate the operation and control of the equipment in accordance with the application and removal of a second signal from the inverter means. This second signal indicates increasing or decreasing electrical demand on the engine electrical system. The third relay means directs the controlling of the speed of the engine by receiving speed selection signals from the switch means and generating governor speed select signals to the engine speed governor. The engine speed governor functions to control the engine throttle speed in accordance with the governor speed select signals.

Additionally, a fourth relay means limits the electrical output of the inverter means to a preselected value when an aerial lift boom having a bucket or platform is in operation by overriding the speed selection signals from the switch means. A fifth relay means prevents damage to the engine alternator and associated mechanical belt driving systems by disconnecting the alternator field from the vehicle electrical system upon the starting or restarting of the vehicle engine.

A second embodiment of the invention includes the controller means of the first embodiment but limits the control elements to only the first and second relay means. The first relay means interrupts the preselected positive voltage signal to the engine speed governor in accordance with the application and removal of a governor on/off signal. This signal is generated by a second relay means as a result of the presence of a first signal from the inverter means and a parking brake engaged signal. The first relay means also has a preset time delay means for delaying the interruption of the preselected positive voltage signal until a time subsequent to the removal of the first signal from the inverter means and expiration of the preset time period.

Also included is a means for selecting a desired electrical load demand to accommodate the operation and control of the equipment in accordance with the application and removal of a second signal from the inverter means. This second signal indicates increasing or decreasing electrical demand on the engine electrical system through the change of dc voltage value over a preselected range. The engine speed governor functions to control the engine throttle speed in accordance with the governor speed select signals embodied in the second signal from the inverter.

Additionally, another relay means sets the electrical output of the inverter means to a preselected value when an aerial lift boom having a bucket or platform is in operation by overriding the second signal from the inverter means containing the governor speed selection signals. Still another relay means prevents damage to the engine alternator or generator and associated mechanical belt driving systems by disconnecting the alternator (or generator) field from the vehicle electrical system upon the starting or restarting of the vehicle engine.

BRIEF DESCRIPTION OF THE DRAWINGS

For the purpose of illustrating the invention, there is shown in the drawings forms which are presently preferred; it being understood, however, that the invention is not limited to the precise arrangements and instrumentalities shown.

FIGS. 1A, 1B and 1C are a diagrammatical representation of a first embodiment of the vehicle engine speed control system of the present invention.

DETAILED DESCRIPTION OF THE INVENTION

The following detailed description is of the best presently contemplated modes of carrying out the present invention. This description is not intended in a limiting sense, but is made solely for the purpose of illustrating the general principles of the invention.

Figure 1A:
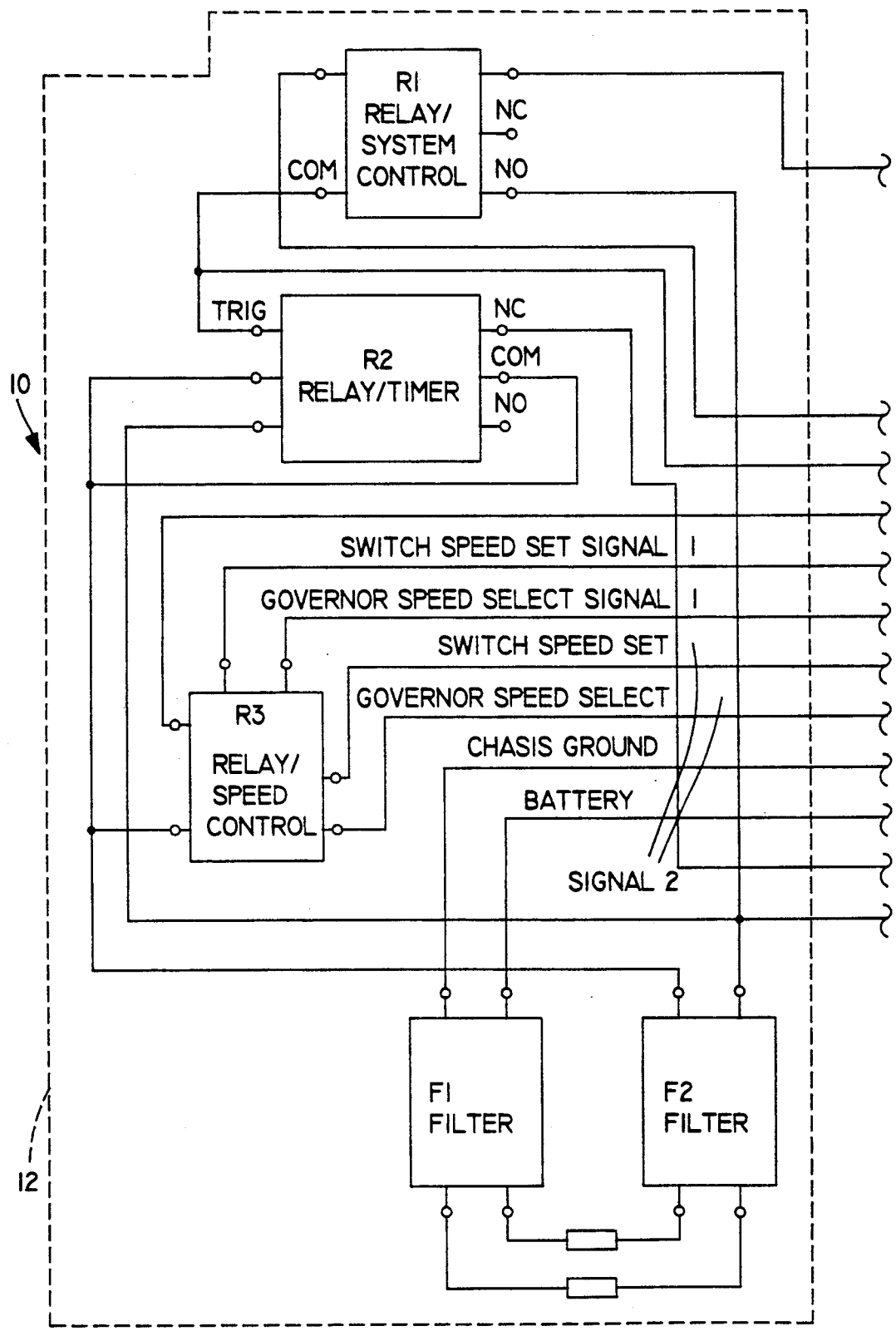
Figure 1B:
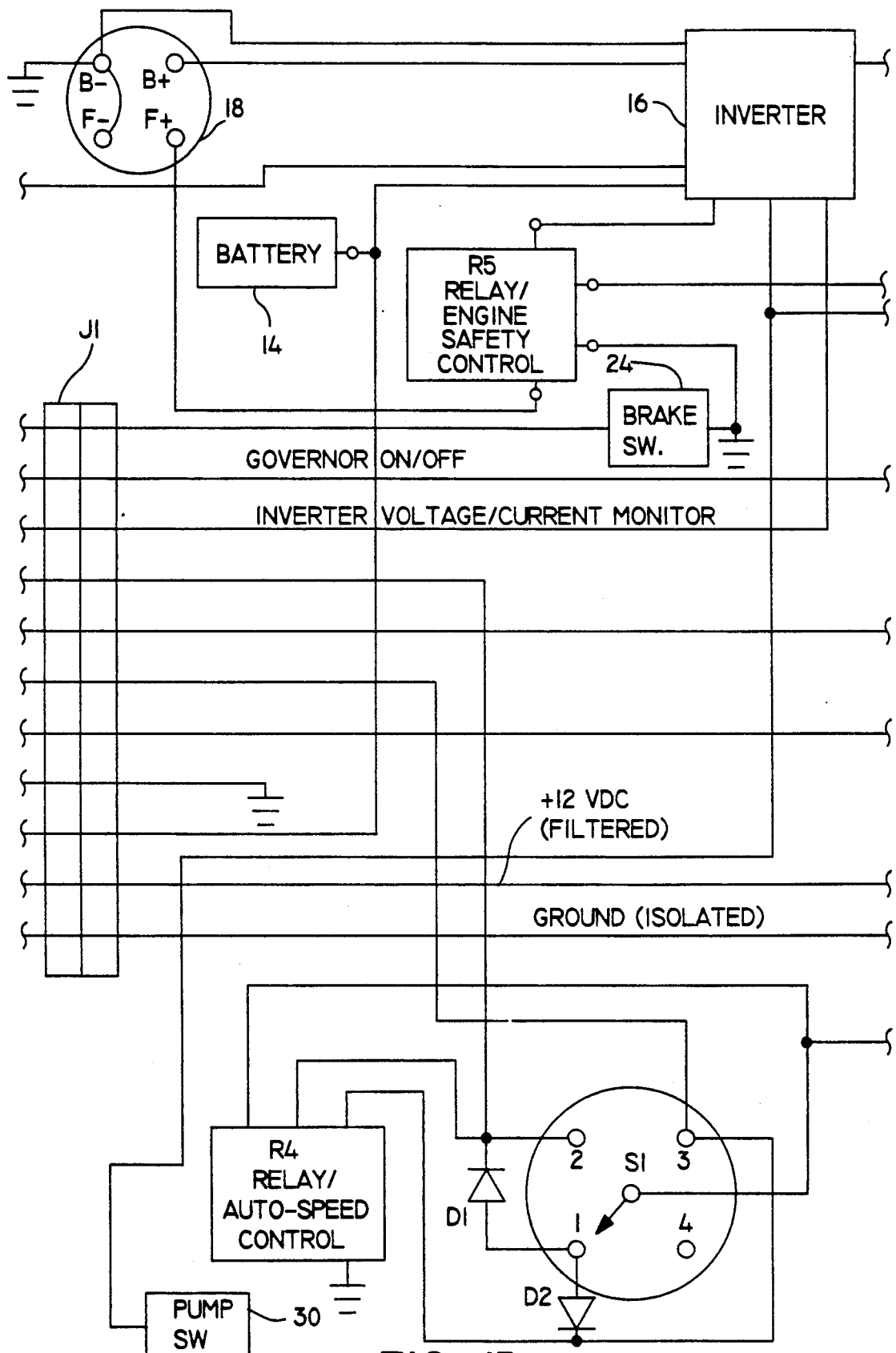

Referring now to the drawings in detail, wherein like numerals represent like elements, there is shown in FIGS. 1A, 1B and 1C a diagrammatical representation of the vehicle engine speed control system 10 of the present invention. Several components of the control system 10 are housed in a container or box 12 (dotted lines) which are connected to other elements of the control system external to the box 12 through connector J1. The connector J1 contains a sufficient number of connecting contacts to accommodate the several signals and voltage levels which are required to enter and exit the box 12. Although the connector J1 may be of any type for conducting signals in and out of box 12, it is preferred that the connector be of the quick connect and disconnect type for use in environmental conditions of high heat and extreme cold without loss of conducting capabilities. The vehicle engine speed control system 10 will be described in conjunction with a vehicle power source of 12 vdc, although other voltages may be utilized, and in connection with a land mobile vehicle (such as a truck), although the invention may be utilized with water and air craft.

A vehicle battery 14, of the aqueous-metal plate storage type, is attached to an inverter 16 to convert the dc voltage from the vehicle alternator 18 to ac voltage for supplying power to one or more portable auxiliary or vehicle mounted devices, which are electrically powered, such as an aerial lift boom with bucket or platform, variable pressure discharge pump, heater and fans, and electrically powered hand tools. The inverter 16 can be one of two types: static or dynamic. It is preferred that a dynamic type inverter be used with the present invention due to the variety of load demands and automatic sensing capabilities. However, it is possible to use an inverter capable of both static and dynamic control.

The minimum requirements of the dynamic inverter 16 are that it be capable of providing 120/240 volts ac (at 60 Hz) from a standard heavy duty high amperage alternator (or generator) for supplying wattage output variable from 0 to 7200 watts. When the inverter 16 is "off", internal relays bypass the inverter transformer and connect the output of the alternator 18 directly to the battery recharging circuit of the vehicle. When the inverter 16 is switched "on", the output of the alternator 18 is disconnected from the battery 14 and then connected to the inverter transformer to be regulated at a fixed voltage along with the field of the alternator 18.

One commercially available dynamic inverter which was found suitable for use with the present invention is manufactured by the Dynamote Corporation of Seattle, Wash. The dynamic inverter 16 is incorporated into the control system 10 of the present invention as described more fully below.

Another element of the invention which requires additional preliminary discussion is the engine speed governor 20. It was found that a commercially available engine throttle governor for stationary engines is manufactured by the Sturdy Truck Equipment, Inc. of Wilmington, N.C. The Sturdy engine throttle governor, with the correct input signals for the engine speed control system of the present invention, was found to have suitable responses for accurate, affirmative control of the speed of either a gasoline or diesel engine when equipment mounted on the vehicle, or used with the vehicle, was operating.

The minimum requirements for operation of the engine speed governor 20 are multiple, selectable preset engine speeds, the ability to positively effect throttle control of either gasoline or diesel engines, and the maintenance of required engine speed in accordance with electrical load demand. Further, the particular throttle governor is adaptable for connecting to automatic speed control mechanisms provided as either standard or special equipment by a number of vehicle manufacturers with little or no required conversion to the governor or the automatic speed control mechanism.

Referring now to FIG. 1A, the inputs received and signals generated by the part of the controller means housed within the container 12 are explained as follows. Filters F1 and F2 are inductive-capacitance type filters of sufficient capacity for isolating and/or reducing vehicle ignition, alternator (or generator), and inverter noise. The Filters F1 and F2 are arranged in series to produce chassis isolated voltage and ground signals for use by other elements of the control system and the governor 20. Filter F1 has one input connected to chassis ground and the other input connected to the vehicle battery 14 which provides 12 volts dc to the control system. At the output of the Filters F1 and F2, the now isolated "ground" signal is passed to the governor 20. The isolated "ground" signal is also connected to the normally open contact of Relay R1, one side of the coil of Relay R3, and to one side of the coil of Time Delay Relay R2. The isolated "voltage" signal is supplied to both the common contact and one side of the coil of Time Delay Relay R2 to be described in greater detail below.

Relay R1 may be described as a single pole-single throw relay. In the normally closed position with a de-energized coil, Relay R1 does not provide an output signal. No connection is made to the normally closed contact of Relay R1. One side of the coil of Relay R1 is connected to a 12 volt dc source from within the inverter 16 and the other side of the coil is connected to the parking brake switch 24. When the parking brake is engaged, the parking brake switch 24 connects the coil of Relay R1 to chassis ground. When the inverter 16 is turned "on" and the parking brake (or other additional conditions to be set forth more fully below) are engaged, the coil of Relay R1 is energized causing the relay to move to its normally open position, connecting the Relay R1 common contact to the isolated ground signal. In the energized position, Relay R1 conducts the isolated ground signal from Filter F2 through the normally open and common contacts of Relay R1 to the trigger input contact of Time Delay Relay R2. The common contact of Relay R1 also supplies the Governor On/Off signal voltage to the engine governor 20 to be described more fully below.

Time Delay Relay R2 may be described as a programmable time delay switch. The Relay R2 has been configured to operate in a one-shot mode to disable the 12 volt dc (filtered) signal throughput to the governor 20 from the Filter F2 when the trigger input is de-energized. One side of the coil of Relay R2 is connected to the 12 volt dc (filtered) signal from the Filter F2. The other side of the coil of Relay R2 is connected to the isolated ground signal, also from Filter F2. The common contact of the time delay switch is connected to the 12 volt dc (filtered) signal output of the Filter F2 and the normally closed contact connected to the governor 20. The trigger input is connected to the common contact of Relay R1 and passes the isolated ground signal to the Relay R2. When the trigger input voltage level is applied, the governor 20 is turned "on". Upon the removal of the trigger input voltage level, the programmable delay begins with the result being the removal of the 12 volt dc (filtered) voltage level from the governor 20, turning the governor "off". The programmable delay begins at 1 second and can be set for more than one hour. In the preferred operating mode, the delay is desired to be five seconds. This provides sufficient time for the governor to release the engine throttle control before being turned off.

When the parking brake is engaged, the parking brake switch 24 is closed and the coil of Relay R1 is energized causing the relay to move to its normally open position. In the energized normally open position, Relay R1 conducts the isolated chassis ground signal to the trigger input of the Time Delay Relay R2. The ground voltage level of the governor on/off signal causes the governor to switch "on" until it is removed. After the expiration of the preset time delay, the governor 20 will switch "off" by removal of the 12 volt dc (filtered) voltage level.

Thus, for the governor 20 to be switched "on", it is required that the inverter 16 be "on" and the parking brake to be engaged. In vehicles having automatic transmissions, it may also be a requirement that the gear shift lever be in "park" or "neutral" in combination with the engaging of the parking brake.

Relay R3 may be described as a double pole-double throw relay. In a slightly different manner than Relays R1 and R2, no connection is made at either of the normally open contacts of Relay R3. One side of the coil of Relay R3 is connected to the isolated ground (from Filter F2) and the other side is connected to a signal source from a sensor means in the inverter 16 for detecting either voltage or current drop off. When the sensor means is monitoring voltage drop, the signal source will provide 12 volts dc to the coil of Relay R3. When the sensor means is monitoring current drop, the signal source will be at ground.

Thus, when the inverter 16 is monitoring the voltage output of its internal transformer, the Relay R3 will be controlling the set speed of the governor 20 in accordance with the level of the inverter voltage/current monitor signal. When the inverter 16 is monitoring current drop, the inverter voltage/current monitor signal will be at 0 volts dc (ground) causing the Relay R3 to become de-energized permitting the governor to return the throttle control to idle or to a preset speed in accordance with the setting of switch S1.

The control connections of Relay R3 to the engine governor 20 are configured to respond to the setting of switch S1 to control the speed setting of the governor 20. One pair of connections from Relay R3, the Governor Speed Select Signal 1 and the Switch Speed Set Signal 1, interconnect the Governor Speed Select Request Signal from the governor 20 through the engine speed selector switch S1. The other pair of connections from Relay R3, the Governor Speed Select Signal 2 and the Switch Speed Select Signal 2, also interconnect the Governor Speed Select Request Signal through the engine speed selector switch S1. The Governor Speed Select Request Signal acts as an inquiry channel for the governor 20 by providing a known voltage level through the engine speed selector switch S1 and Relay R3 to be detected by the governor 20 on the return channels, the Governor Speed Select Signals 1 and 2. The voltage levels detected by the governor 20 for the Governor Speed Select Signals 1 and 2 determine the engine speed the governor 20 will set.

When Relay R3 is energized the connections between the pairs of signals Switch Speed Set Signals 1 and 2 and the Governor Speed Select Signals 1 and 2 are open such that an absence of a voltage level will be detected by the governor 20. (This absence of a detectable voltage level will cause the governor 20 to increase the throttle control to maximum speed.) When the coil of Relay R3 is de-energized by the monitoring of the current output of the inverter transformer by the sensor in the inverter 16, the connections between the pairs of signals, the Switch Speed Set Signals 1 and 2 and the Governor Speed Select Signals 1 and 2, are completed and a voltage level can be detected by the governor 20. It is required, though, for operation of the governor 20, that the inverter 16 be switched "on" and that the sensor means in the inverter be monitoring voltage/current output of the inverter transformer.

The engine speed selector switch S1 uses a combination of settings and a limited diode network to select the appropriate engine speed corresponding to the required wattage output of the inverter 16. The Switch Speed Set Signal 1 from Relay R3 is connected to switch S1 position 2 and through diode D1 to switch S1 position 1. The Switch Speed Set Signal 2 from Relay R3 is connected to switch S1 position 3 and through diode D2 to switch S1 position 1. The Governor Speed Select Request Signal from the governor 20 is connected to the arm of switch S1. No connection is made to position 4 of switch S1. The resulting speed settings with corresponding wattages are as follows.

With the arm of switch S1 set to position 1, the voltage level supplied by the Governor Speed Select Request Signal is applied to both Switch Speed Set Signals 1 and 2 through diodes D1 and D2. This voltage level, which is passed through Relay R3 and detected by the governor 20 by the Governor Speed Select Signals 1 and 2, indicates a speed setting corresponding to a power output requirement of 2400 watts. When the arm of switch S1 is moved to position 2 the voltage level supplied by the Governor Speed Select Request Signal is applied only to Switch Speed Set Signal 1. Diode D1 blocks the voltage level signal from Switch Speed Set Signal 2. The governor 20 detects a voltage level only for the Governor Speed Select Signal 1 which indicates a speed setting corresponding to a power output requirement of 3600 watts.

When the arm of switch S1 is moved to position 3, the voltage level supplied by the Governor Speed Select Request Signal is applied only to Switch Speed Set Signal 2. Diode D2 blocks the voltage level signal from Switch Speed Set Signal 1. The governor 20 detects a voltage level only for the Governor Speed Select Signal 2 which indicates a speed setting corresponding to a power output requirement of 4800 watts. When the arm of switch S1 is moved to position 4, all connections between the Governor Speed Select Request Signal and the Governor Speed Select Signals 1 and 2 are interrupted. The failure to detect the voltage level of the Governor Speed Select Request Signal on either Governor Speed Select Signals 1 or 2 indicates the maximum preset engine speed setting corresponding to a power output requirement, in the preferred embodiment, of 7200 watts. (This condition is identical to the result of energizing Relay R3.) A higher wattage output can be obtained without engine damage, but greater wattage is not deemed to be necessary for operation of the vehicle mounted equipment and associated apparatus and power hand tools presently being used.

The engine governor 20 receives its "on/off" signal from the common contact of Relay R1 and its operating power from the outputs of Filters F1 and F2, as controlled by Time Delay Relay R2. The governor 20 turns "on" with the presence of the isolated ground signal passed through Relay R1 and turns "off" when this signal is interrupted. Once energized, the governor 20 queries the switch S1/Relay R3 network to determine the selected speed setting. Once the speed corresponding to the desired wattage output is determined, the governor 20 begins to monitor engine speed through a magnetic pick-up coil 26, or similar device, which monitors the engine revolutions. The magnetic pick-up coil 26 may be attached to the field coil, in internal combustion engines, to monitor the pulsing rate of the distributor. In diesel engines, the magnetic pick-up coil 26 would monitor engine revolutions. Other methods of measurement may be to mount the magnetic pick-up coil 26 on the engine timing chain cover to monitor the cam teeth, on the bell housing to monitor the flywheel teeth, or on the tachometer cable to monitor generated pulses.

The speed of the engine is controlled by the governor 20 asserting positive control over the automatic speed control 28 of the vehicle. Because the fuel injection systems used by vehicle manufacturers today are under electronic control and provide no direct mechanical access, as was the experience with mechanical carburetor systems where engine speed could be controlled by mechanically rotating the throttle plate, the governor is attached by means of a cable linkage to the vehicle automatic speed control 28. The positive control over the engine speed by the governor 20 is continued at the requested level until a different speed is selected on switch S1, an increased demand is detected by the inverter voltage/current monitor, the inverter 16 is turned "off", or the safety circuits are broken.

When the inverter 16 is turned "off" or the parking brake is released, Relay R1 loses its coil current and switches back to its normally closed condition. This will remove the isolated ground signal from being passed through Relay R1 causing the governor 20 to receive a signal indicating it is to turn off. When the isolated ground signal is removed from the common contact of Relay R1, the trigger input level is also removed from Time Delay Relay R2 beginning the delay period before the power is removed from the governor 20. Further, when the inverter 16 is turned "off", Relay R3 loses its coil current which causes an absence of detectable voltage levels on the Governor Speed Select lines. Although the governor 20 is detecting a request from Relay R3 for maximum speed, the Governor On/Off signal from Relay R1 overrides the speed request detection and causes the governor 20 to return the throttle control to idle speed. The delay in removing the power from the governor 20 permits the governor sufficient time to return the throttle control to idle speed by releasing the automatic speed control 28.

An alternate circumstance which will cause the turning off of the governor 20 occurs when the engine is running and then turned off. The B+ voltage from the alternator 18 will drop off. When the B+ voltage drops below approximately 10 volts dc, the inverter 16 will automatically switch off causing the foregoing conditions to occur.

It has been found that operating a vehicle mounted aerial bucket or platform when an engine speed corresponding to more than 2400 watts has been selected causes erratic and potentially dangerous results. A maximum limit of 2400 watts is required for safe operation of the aerial boom. Most aerial buckets or platforms operate using an hydraulic system for rotating and extending the boom. If the vehicle is not equipped with an hydraulic flow control valve to prevent increased hydraulic fluid flow when the switch S1 is set to select a greater power output than 2400 watts, then, for the safety of the operator, Relay R4 is recommended for use with the engine speed control system of the present invention.

Relay R4 may be described as a triple pole-single throw relay with one side of its coil connected to chassis ground and the other side connected to the output of an hydraulic pump clutch switch 30 associated with the aerial boom mounted on the vehicle. When the aerial boom is to be operated, 12 volts dc is applied to the hydraulic pump clutch switch 30 which energizes the coil of Relay R4 and closes the contacts. No connection is made at any of the normally open contacts of Relay R4. A first contact of each of the three sets of connections is joined or shunted together with a first contact of each of the other connections. A second contact of each of the three sets of connections is connected respectively to the Switch Speed Set Signals 1 and 2 and the Governor Speed Select Request Signal. When Relay R4 is energized, the aforementioned Signals are joined or shunted together in a similar configuration to position 1 of switch S1 with identical results. The speed select indication received by the governor 20 is automatically set to a speed corresponding to a power output of 2400 watts. Thus, when the hydraulic pump clutch switch 30 is activated, the engine speed is at the predetermined rpm rate for the inverter 16 to provide only 2400 watts. This is so regardless of the position of the arm of switch S1.

In order to prevent damage to the alternator 18 during starting or restarting of the vehicle engine if the inverter 16 is "on", Relay R5 has been interposed between the inverter 16 and the positive field connection, F+, of the alternator 18. Relay R5 may be described as a single pole-single throw normally closed relay. One side of the coil of Relay R5 is connected to ground and the other side of the coil is connected to the momentary engine starting contact of the key switch 22. When the coil of Relay R5 is energized upon the starting or restarting of the vehicle engine, the contacts are opened and the alternator field circuit is opened causing the alternator 18 to be turned "off". This prevents slipping of the alternator belt and damage to the alternator 18 or the engine during starting or restarting.

As an example of operating conditions of the engine speed control system 10, the invertor voltage/current monitor means in the inverter 16 continually monitors the output voltage of the inverter transformer to detect a percentage drop-off in voltage level due to an increase in load demand from auxiliary portable or vehicle mounted equipment. When such increased load demand is experienced, as indicated by the voltage output drop-off, the invertor voltage/current monitor signal changes voltage level (ground to positive) energizing Relay R3 and causing the governor 20 to assume its highest preset speed with corresponding wattage output from the inverter 16 of 7200 watts. This is due to the removal of the Governor Speed Select Signals 1 and 2 giving rise to the identical circumstance as if switch S1 were set to position 4. When the electrical load demand is curtailed or removed, the voltage/current monitoring means in the inverter 16 detects the drop-off in current from the inverter transformer output de-energizing the coil of Relay R3 by resuming the prior voltage level in the Inverter Voltage/Current Monitor signal. This, in turn, causes the governor 20 to resume the selected speed in accordance with the position of the arm of switch S1. Thus, Relay R3 again sends the Governor Speed Select Signals 1 and 2 to the governor 20 to set and maintain the selected wattage output of the inverter 16 by controlling the engine speed through the automatic speed control 28.

Figure 2:
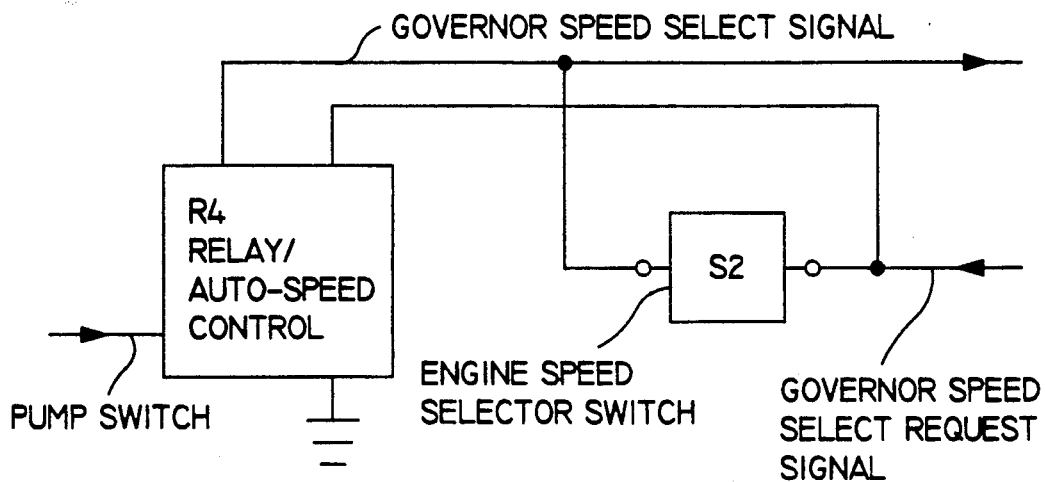
FIG. 2 is a diagrammatical representation of an alternate switch means used to generate engine speed governor speed selection signals.

An alternate switch means for control of engine governor speed of the present invention, as shown in FIG. 2, substitutes for the Relay R3 and engine speed selector switch S1 the engine speed selector switch S2. The switch S2 is disposed between the Governor Speed Select Request Signal emanating from the governor 20 and the Governor Speed Select Signal supplied to the governor 20. Upon the closure of the switch S2 the preselected governor speed will be implemented. If the switch S2 is opened, this is the same as an absence of the signal as described above in connection with Relay R3, and will cause the governor to implement its maximum speed providing a higher wattage output from the inverter to accommodate an increased electrical demand for the number of pieces of operating equipment connected to the vehicle electrical system.

As in the case of the engine speed selector switch S1, when the aerial boom mounted on the vehicle is in use, it has been found that the wattage output of the inverter should be restricted to a maximum limit of 2400 watts regardless of the position of switch S2. Thus, when the hydraulic pump clutch switch 30 is energized, Relay R4 automatically supersedes the setting of switch S2 and causes the setting of the governor speed corresponding to a power output of 2400 watts. As can be seen from FIG. 2, the Relay R4 joins or shunts together the Governor Speed Select Request Signal and the Governor Speed Select Signal, effectively removing switch S2 from the circuit. The limited power output is dependent upon, not only the equipment needed to be operated with the aerial boom, but also the type vehicle or craft in which the controller system in mounted, and can be set at higher or lower wattage levels.

In this alternate method of controlling governor set speed, with the exception of the aforementioned substitution of the switch S2 for the circuit elements Relay R3 and switch S1, the remainder of the vehicle engine speed control system 10 of the present invention remains as described in connection with the first embodiment. The switch S2 may be of the single pole single throw type, which connects single signal lines at each contact of the switch. It is further contemplated for switch S2 to have a single throw and an equal but multiple number of poles or contacts on either side of the switch.

Figure 3A:
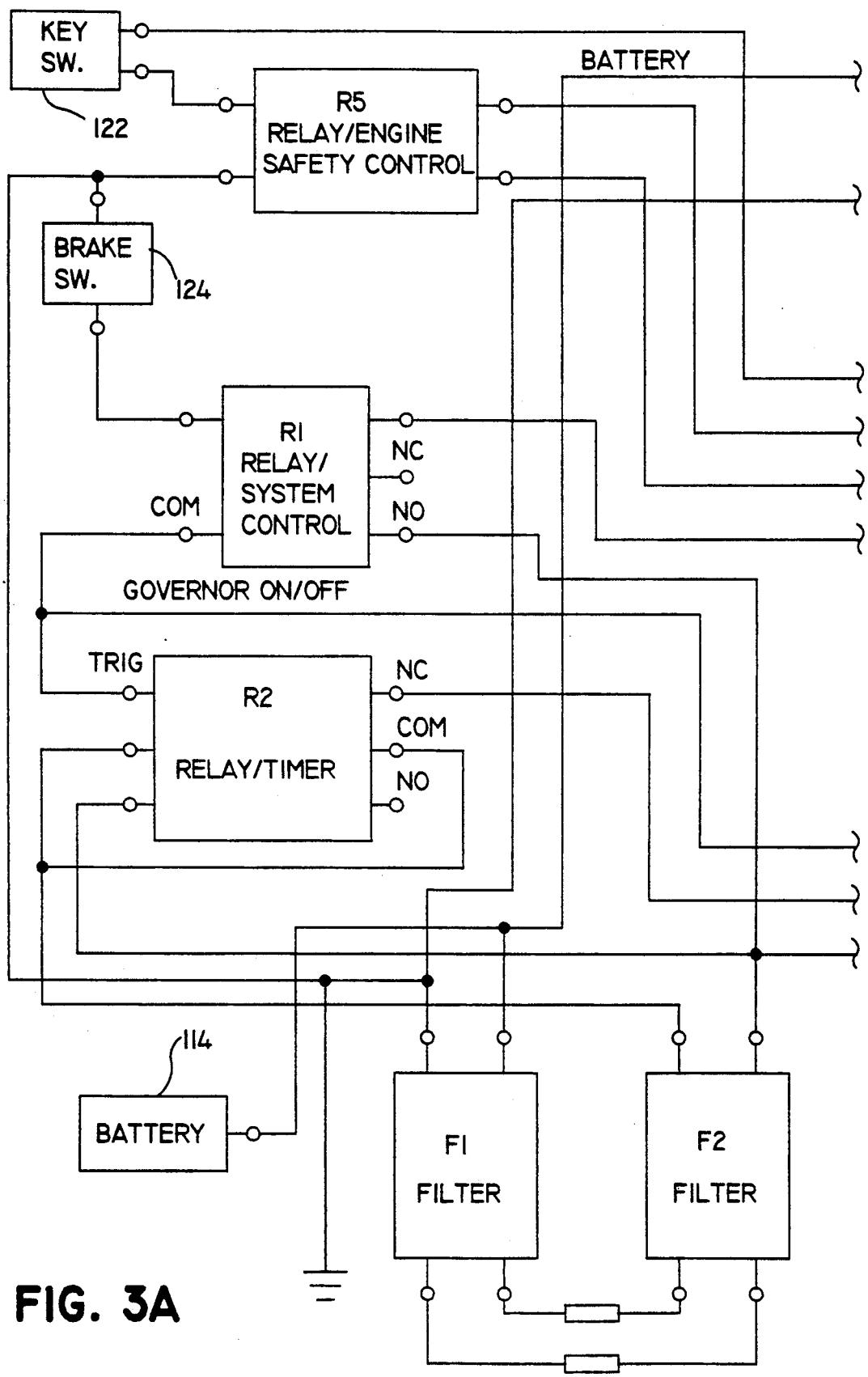
FIGS. 3A and 3B are a diagrammatical representation of a second embodiment of the vehicle engine speed control system of the present invention.
Figure 3B:
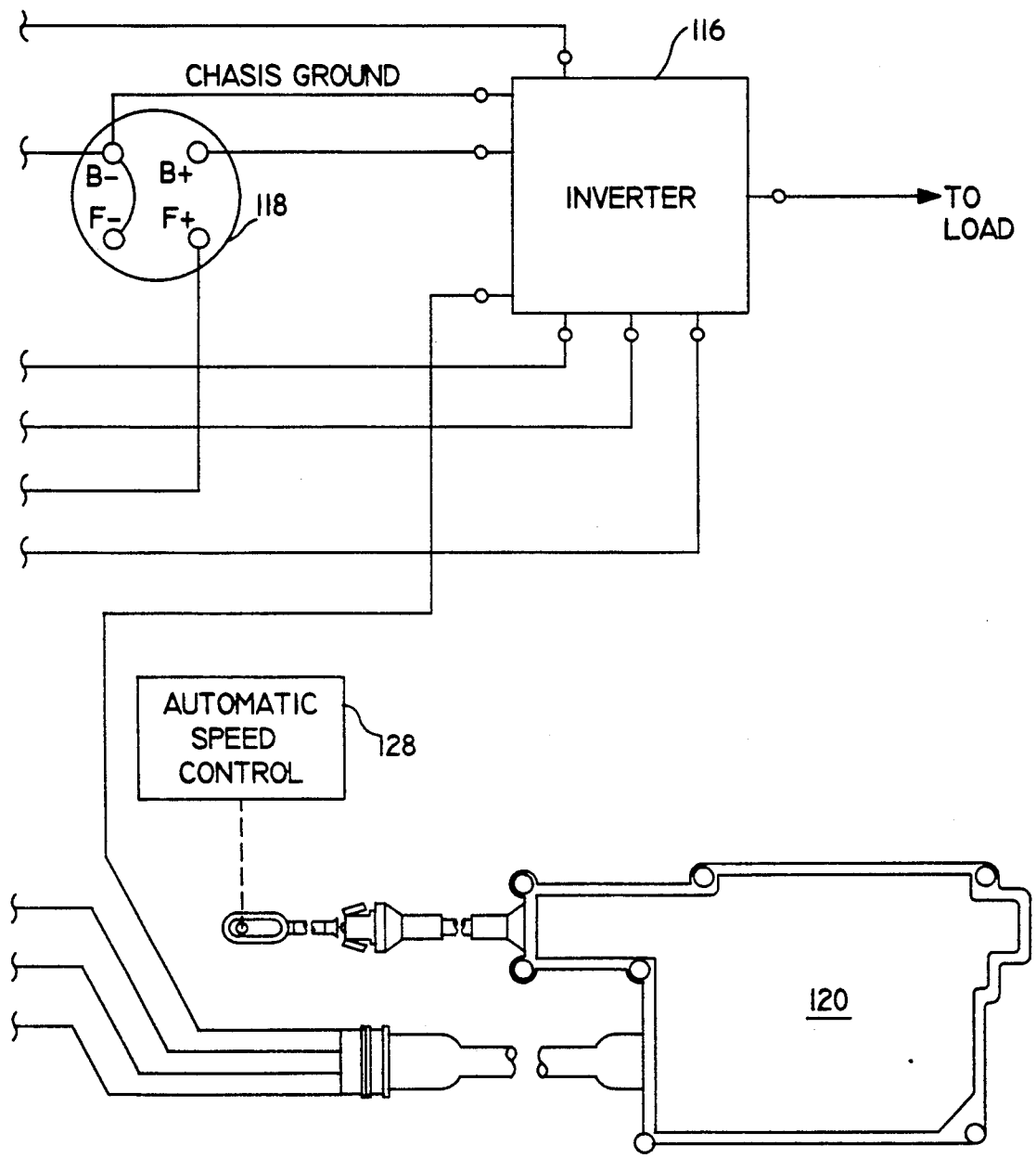

Referring now to FIGS. 3A and 3B, an alternative embodiment of the present invention is shown. A similar numbering scheme has been used adding a "1" before the numeral indicating the same or identical element as shown in FIGS. 1A, 1B and 1C. The operation and arrangement of filters F1 and F2, Relay R1 and Time Delay Relay R2 is identical to that as described in connection with the first embodiment of the invention, and further discussion is not necessary. Omitted from this embodiment are Relay R3 and switch S1 for the reason that the governor 120 can now be programmed to accept a voltage level change over a predetermined range to indicate the desired engine speed select signal based upon the electrical demand experienced by the inverter 116. The inverter 116 can create a signal containing information in the form of a voltage value indicative of experienced electrical demand. This signal is applied directly to the governor 120 where the information is extracted by comparing the inverter voltage value to preselected voltage values. The detection of a change in signal voltage by the governor 120 causes the automatic speed control means 128 to vary accordingly. Thus, engine rpm is controlled by directly monitoring electrical demand by the inverter 118, transferring that information through "coded" signals to the governor 120 for "decoding", and resulting control over engine speed through connection to the automatic speed control means 128. This automatic feedback control system is desired to operate with a dc voltage in the range of approximately 1.5 to 3.5 volts dc with a current of 10 milliamps. This voltage range may vary depending upon the type engine used in the vehicle, or water or air craft, and the range of electrical demand from the equipment utilized.

Certain tests have been run on different types of engines with a variety of auxilliary and vehicle mounted equipment in operation. It has been found that when a greater electrical load than exists at engine idle speed (1200 watts) is applied to the inverter 118, the output signal from the inverter 118 varies in direct proportion to the electrical load being applied. Voltage curves have been developed which depict this proportionality as shown in Table 1.

TABLE 1

| WATTAGE OUTPUT | SIGNAL VOLTAGE | ENGINE RPM DIESEL | I-C |
|---|---|---|---|
| 1200 | 3.5 | 1250 | 1100 |
| 2400 | 3.1 | 1350 | 1200 |
| 3600 | 2.7 | 1500 | 1300 |
| 4800 | 2.3 | 1650 | 1400 |
| 6000 | 1.9 | 1850 | 1600 |
| 7200 | 1.5 | 2550 | 2200 |

The inverter signal output must have a voltage limiting circuit so that the voltage value will not decrease below 1.5 volts dc when the inverter 118 is at full rated power so as not to damage the engine or any control system components.

When first turned on in response to a start or restart of the engine, the inverter 118 will send a signal having a voltage value of 3.2 to 3.5 volts dc to the governor 120. The signal, when received, tells the governor 120 to advance the engine (through the automatic speed control means 128) from idle to the rpm values in Table 1 for a 1200 watt output from the inverter. This method, of encoding the information necessary for selecting an appropriate engine rpm setting to achieve the required power output from the inverter 118, makes the Relay R3 and switches S1 and S2 of the first embodiment no longer necessary. All other functions and safeguards remain identical to the previously described embodiment with the inverter 116 supplying electrical power directly to whatever load device is desired to be powered.

Figure 4:
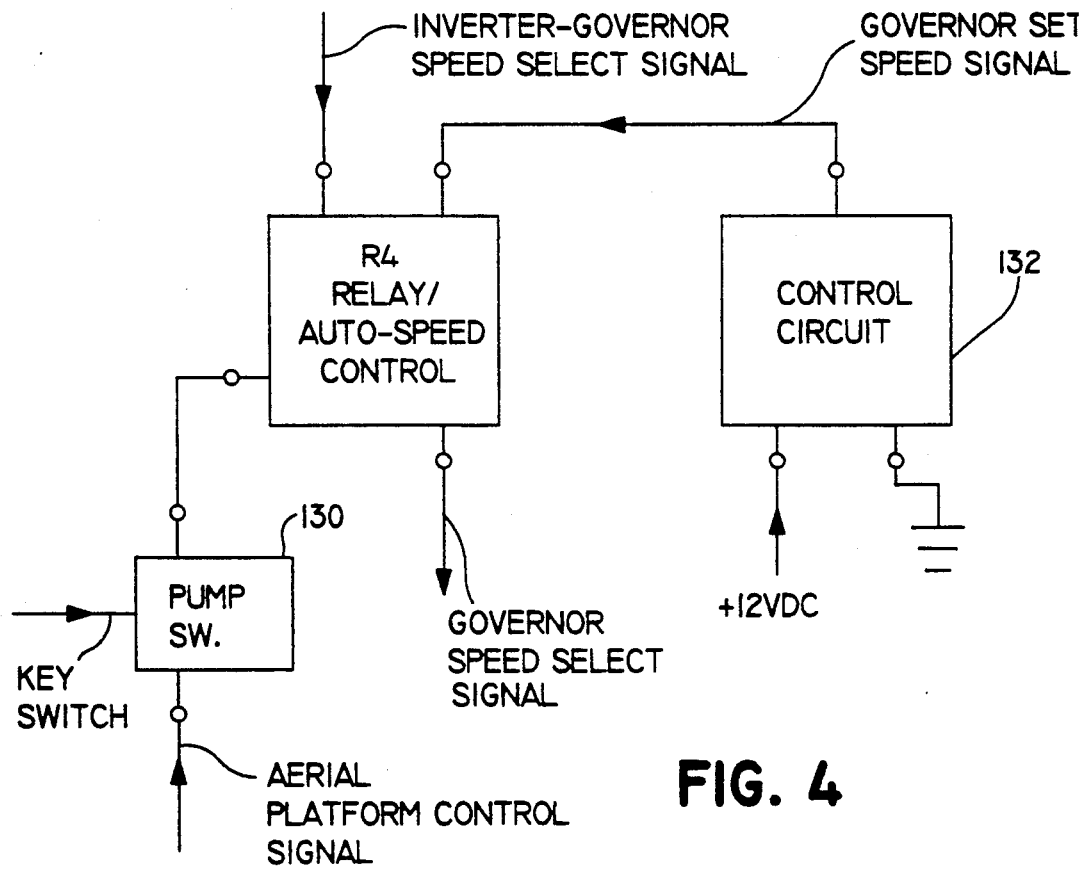
FIG. 4 is a diagrammatical representation of an override control means used to generate a preselected engine speed select signal.

As in the first embodiment there is a need to set a maximum wattage output when the aerial boom is to be in operation. With reference to FIG. 4, this safety feature is made adaptable to the second embodiment of the invention. The Relay R4 is interposed in the voltage signal line from the inverter 119, which signal contains the "encoded" information for governor speed selection. Since the aerial boom is hazardous to operate at greater than a 3600 watt power output, a voltage signal must be applied to the governor 120 which indicates that maximum power selection. The Relay R4 is a single pole-single throw relay with its coil connected to the hydraulic pump switch 130 for indicating the use of the aerial boom. The hydraulic pump switch 130 is operable only with the key switch 122 on and the aerial boom set to operate. When the pump switch 130 is energized, the coil of Relay R4 causes the relay to switch over to the alternate connection to the Control Circuit 132 which provides a preselected constant voltage to the Governor Speed Select Signal input achieving the maximum speed required for limiting the power output of the inverter 118. The fixed voltage applied from the Control Circuit 132 approximates 2.7 volts dc. This will limit the maximum power output through the governor 120 control of the automatic speed control means 128 to 3600 watts at the output of the inverter 118. However, this fixed voltage level can be varied and is dependent upon, not only the equipment needed to be operated with the aerial boom, but also the type vehicle or craft in which the controller system in mounted. The Control Circuit can be assembled from a variety of elements, all well known in the art of electrical circuit construction, needing only to achieve a fixed voltage output from a 12 volt dc input. Hence, the output of the Control Circuit, the Governor Set Speed Signal, will be applied to the governor 120 instead of the variable Inverter/Governor Speed Select Signal when the aerial boom is to be operated.

The present invention may be embodied in other specific forms without departing from the spirit or essential attributes thereof and, accordingly, reference should be made to the appended claims, rather than to the foregoing specification, as indicating the scope of the invention.

I claim:

1. A vehicle engine speed controller means for automatically determining the electrical load demand made of the engine electrical system from portable auxiliary and vehicle mounted electrically operated or controlled equipment, singly or in combination, and dynamically controlling the engine throttle speed setting by increasing or decreasing said setting within predetermined maximum and minimum limits comprising:

an electrical power source;

an inverter means for converting and monitoring electrical power produced by the vehicle engine coupled to the electrical power source;

an engine speed governor, adaptable for coupling to an automatic speed control means on the vehicle engine to control engine revolutions;

a filter means coupled to the electrical power source for substantially reducing electrical noise emanating from the vehicle engine ignition, alternator, or the inverter means, and for generating pre-selected positive and ground signals to be provided to power the engine speed governor;

a first relay means for interrupting the pre-selected positive voltage signal to the engine speed governor, generated by a second relay means, in accordance with the application and removal of a governor on/off signal as a result of the presence of a first signal from the inverter means and a parking break engage signal, said second relay means having a pre-set time delay means for delaying the interruption of the pre-selected positive voltage signal until subsequent to the removal of the governor on/off signal and expiration of the pre-set time period;

a multi-stage selector switch means for setting the desired minimum and maximum electrical load demand values to accommodate the operation and control of the equipment in accordance with generated speed selection signals;

a third relay means coupled with said selector switch means for automatically selecting the required engine speed to satisfy the electrical load demand in accordance with the application and removal of a second signal from the inverter means, said second signal indicating increasing or decreasing electrical demand on the engine system, and the speed selection signals from the switch means and automatically generating governor speed select signals to the engine speed governor, said engine speed governor increasing or decreasing the engine throttle speed in accordance with the governor speed select signals.

2. Apparatus in accordance with the vehicle engine speed controller means of claim 1 wherein a fourth relay means limits the electrical output of the inverter means to a preselected minimum electrical load demand value when one or more pieces of vehicle mounted equipment is in operation by overriding the speed selection signals from the switch means and maintaining said preselected minimum value regardless of load demand.

3. Apparatus in accordance with the vehicle engine speed controller means of claim 1 wherein a fifth relay means prevents damage to the engine alternator and associated mechanical belt driving systems by disconnecting the alternator field and the inverter means from the vehicle electrical system upon the starting or restarting of the vehicle engine.

4. A vehicle engine speed controller means for automatically determining the electrical load demand made of the engine electrical system from portable auxiliary and vehicle mounted electrically operated or controlled equipment, singly or in combination, and dynamically controlling the engine throttle speed setting by increasing or decreasing said setting within predetermined maximum and minimum limits comprising:

an electrical power source;

an inverter means for converting and monitoring electrical power produced by the vehicle engine coupled to the electrical power source;

an engine speed governor, adaptable for coupling to an automatic speed control means on the vehicle engine to control engine revolutions;

a filter means coupled to the electrical power source for substantially reducing electrical noise emanating from the vehicle engine ignition, alternator, or the inverter means, and for generating preselected positive and ground signals to be provided to power the engine speed governor;

a first relay means for interrupting the preselected positive voltage signal to the engine speed governor, generated by a second relay means, in accordance with the application and removal of a governor on/off signal as a result of the presence of a first signal from the inverter means and a parking brake engaged signal, said second relay means having a preset time delay means for delaying the interruption of the preselected positive voltage signal until subsequent to the removal of the governor on/off signal and expiration of the preset time period;

a selector switch means for setting the desired minimum and maximum electrical load demand to accommodate the operation and control of the equipment and automatically generating a governor speed select signal to the engine speed governor, said engine speed governor increasing or decreasing the engine throttle speed in accordance with the governor speed selected signal.

5. Apparatus in accordance with the vehicle engine speed controller means of claim 4 wherein a third relay means limits the electrical output of the inverter means to a preselected minimum electrical load demand value when one or more pieces of vehicle mounted equipment is in operation by overriding the speed selection signal from the switch means and maintaining said preselected minimum value regardless of load demand.

6. Apparatus in accordance with the vehicle engine speed controller means of claim 4 wherein a fourth relay means prevents damage to the engine alternator and associated mechanical belt driving systems by disconnecting the alternator field and the inverter means from the vehicle electrical system upon the starting or restarting of the vehicle engine.

7. A vehicle engine speed controller means for automatically determining the electrical load demand made of the engine electrical system from portable auxiliary and vehicle mounted electrically operated or controlled equipment, singly or in combination, and dynamically controlling the engine throttle speed setting by increasing or decreasing said setting within predetermined maximum and minimum limits comprising:

an electrical power source;

an inverter means for converting and monitoring electrical power produced by the vehicle engine coupled to the electrical power source;

an engine speed governor, adaptable for coupling to an automatic speed control means on the vehicle engine to control engine revolutions;

a filter means coupled to the electrical power source for substantially reducing electrical noise emanating from the vehicle engine ignition, alternator, or the inverter means, and for generating preselected positive and ground signals to be provided to power the engine speed governor;

a first relay means for interrupting the preselected positive voltage signal to the engine speed governor, generated by a second relay means, in accordance with the application and removal of a governor on/off signal as a result of the presence of a first signal from the inverter means and a parking brake engaged signal, said second relay means having a preset time delay means for delaying the interruption of the preselected positive voltage signal until subsequent to the removal of the governor on/off signal and expiration of the preset time period;

a second signal from the inverter means containing coded information detectable by the governor and indicating increasing or decreasing electrical demand on the engine system for automatically selecting a governor controlled engine speed for the detected electrical load demand needed to accommodate the operation and control of the equipment.

8. Apparatus in accordance with the vehicle engine speed controller means of claim 7 wherein a third relay means limits the electrical power output of the inverter means to a preselected load demand value when one or more pieces of vehicle mounted equipment is in operation by overriding the second signal from the inverter and applying a substitute signal for maintaining said preselected load value regardless of a change in load demand.

9. Apparatus in accordance with the vehicle engine speed controller means of claim 7 wherein a fourth relay means prevents damage to the engine alternator and associated mechanical belt driving systems by disconnecting the alternator field and the inverter means from the vehicle electrical system upon the starting or restarting of the vehicle engine.

* * * * *